US007201416B2

(12) United States Patent
Rist

(10) Patent No.: US 7,201,416 B2
(45) Date of Patent: Apr. 10, 2007

(54) REAR ENTERTAINMENT SYSTEM

(75) Inventor: Johannes Rist, Munich (DE)

(73) Assignee: Lear Corporation, Southfield, MI (US)

( * ) Notice: Subject to any disclaimer, the term of this patent is extended or adjusted under 35 U.S.C. 154(b) by 111 days.

(21) Appl. No.: 10/905,364

(22) Filed: Dec. 30, 2004

(65) Prior Publication Data
US 2006/0152026 A1    Jul. 13, 2006

(51) Int. Cl.
*B60R 27/00*    (2006.01)
(52) U.S. Cl. .................. 296/24.34; 296/37.8
(58) Field of Classification Search ........... 296/24.34, 296/24.16, 37.1, 37.8, 37.12, 37.15, 37.16
See application file for complete search history.

(56) References Cited

U.S. PATENT DOCUMENTS

| 5,179,447 A | 1/1993 | Lain |
| 6,031,714 A | 2/2000 | Ma |
| 6,158,795 A | 12/2000 | Gray et al. |
| 6,179,263 B1 | 1/2001 | Rosen et al. |
| 6,338,429 B1 | 1/2002 | Pesce |
| 6,354,649 B1 * | 3/2002 | Lee ........................... 296/37.1 |
| 6,494,527 B1 | 12/2002 | Bischoff |
| 6,663,155 B1 * | 12/2003 | Malone et al. ............. 296/37.8 |
| 6,719,343 B2 * | 4/2004 | Emerling et al. ......... 296/24.34 |
| 6,746,065 B1 * | 6/2004 | Chan ....................... 296/24.34 |
| 2002/0163215 A1 * | 11/2002 | Emerling et al. ........... 296/24.1 |
| 2003/0234550 A1 * | 12/2003 | Brooks et al. ............. 296/24.1 |
| 2004/0160096 A1 | 8/2004 | Boudinot |
| 2004/0245796 A1 * | 12/2004 | Maierholzner ............. 296/37.8 |
| 2005/0006918 A1 * | 1/2005 | Neumann et al. ......... 296/24.34 |
| 2005/0018392 A1 * | 1/2005 | Strohmeier et al. ........ 296/37.8 |
| 2005/0052046 A1 * | 3/2005 | Lavelle et al. ........... 296/37.15 |
| 2005/0116487 A1 * | 6/2005 | Isaacson .................... 296/37.8 |
| 2006/0097537 A1 * | 5/2006 | Schedivy ................... 296/37.8 |
| 2006/0108820 A1 * | 5/2006 | Vican ..................... 296/37.12 |

FOREIGN PATENT DOCUMENTS

WO    WO 2004/028861 A2    4/2004

* cited by examiner

*Primary Examiner*—Lori L. Coletta
(74) *Attorney, Agent, or Firm*—Brooks Kushman P.C.

(57) ABSTRACT

A collapsible entertainment system for integration into the passenger compartment of a motor vehicle includes a frame adapted to be pivotably mounted to a passenger compartment component and a display. The display is characterized by having a viewing side for viewing by one or more passengers in a vehicle. The display is attached to the frame such that the display is moveable in two directions about the frame. The mobility of the display allows the entertainment system to be collapsed for stowing.

18 Claims, 2 Drawing Sheets

REAR ENTERTAINMENT SYSTEM

BACKGROUND OF THE INVENTION

1. Field of the Invention

The present invention is related to entertainments systems to be mounted in the passenger compartment of an automobile.

2. Background Art

Over time, motor vehicles have evolved in complexity with consumer expectations demanding the inclusion of modern electronic devices that are not necessarily related to automobile driveablity. Examples of electronic devices that are being incorporated in automobiles are global positioning devices, entertainment systems such as DVD player, TVs, CD players, video game systems, and the like.

It is desirable that the incorporation of these electronic components integrate into a motor vehicle compartment in an aesthetically pleasing manner with a minimal amount of vehicle passenger compartment space being sacrificed. Several prior art systems and methods are known for mounting monitors in airplanes and buses for personal viewing by the occupant of a given seat. U.S. Pat. No. 5,179,447 ("the '447 patent") and U.S. Pat. No. 6,179,263 ("the '263 patent) disclose such systems. Although these systems may be satisfactory for their intended applications, the systems of the '447 patent and the '263 patent are less useful for normal passenger automobile applications. In such passenger vehicles, personal viewing is generally not as desirable as viewing by several people typically seated in the back seat of a car or in the rear seats of SUVs or vans. Inclusion of one monitor for each passenger seat in a passenger vehicle is too expensive and impractical. Another consideration is that typically not every seat in an passenger vehicle has an armrest. Moreover, many of the stowable prior art entertainment systems tend to be complex thereby potentially increasing the costs of their incorporation into automobile passenger compartments.

Accordingly, there exists a need in the prior art for improved entertainment systems particularly suited for integration into the passenger compartments of passenger cars, SUVs, and vans.

SUMMARY OF THE INVENTION

The present invention overcomes one or more problems of the prior art by providing in one embodiment a collapsible entertainment system for inclusion in the passenger compartment of a motor vehicle. The collapsible entertainment system of the invention includes a frame pivotably mounted to the passenger compartment component and a display. The mounting of the frame to the passenger compartment component allows for the frame to be rotated about that component. The display is characterized by having a viewing side for viewing by one or more passengers in a vehicle. The display is attached to the frame such that the display is moveable in two directions about the frame. The entertainment system of the invention advantageously allows for the viewing side to be simultaneously viewed by several passengers in a vehicle's passenger compartment. The frame allows positioning of the display at a sufficient height so that the display is observable by several passengers. Moreover, the positionability of the display about the frame allows further adjustability and optimization of the display's position. The combined mobility of the display and the frame allow the entertainment system to be collapsed for stowing. Specifically, the entertainment system is collapsible (i.e., folded) by pivoting the frame in a first direction and the monitor in a second direction that is opposite to the first direction such that the monitor is positionable within a receiving opening in the frame. When collapsed, the viewing side of the display faces the passenger compartment component.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Figure 1:
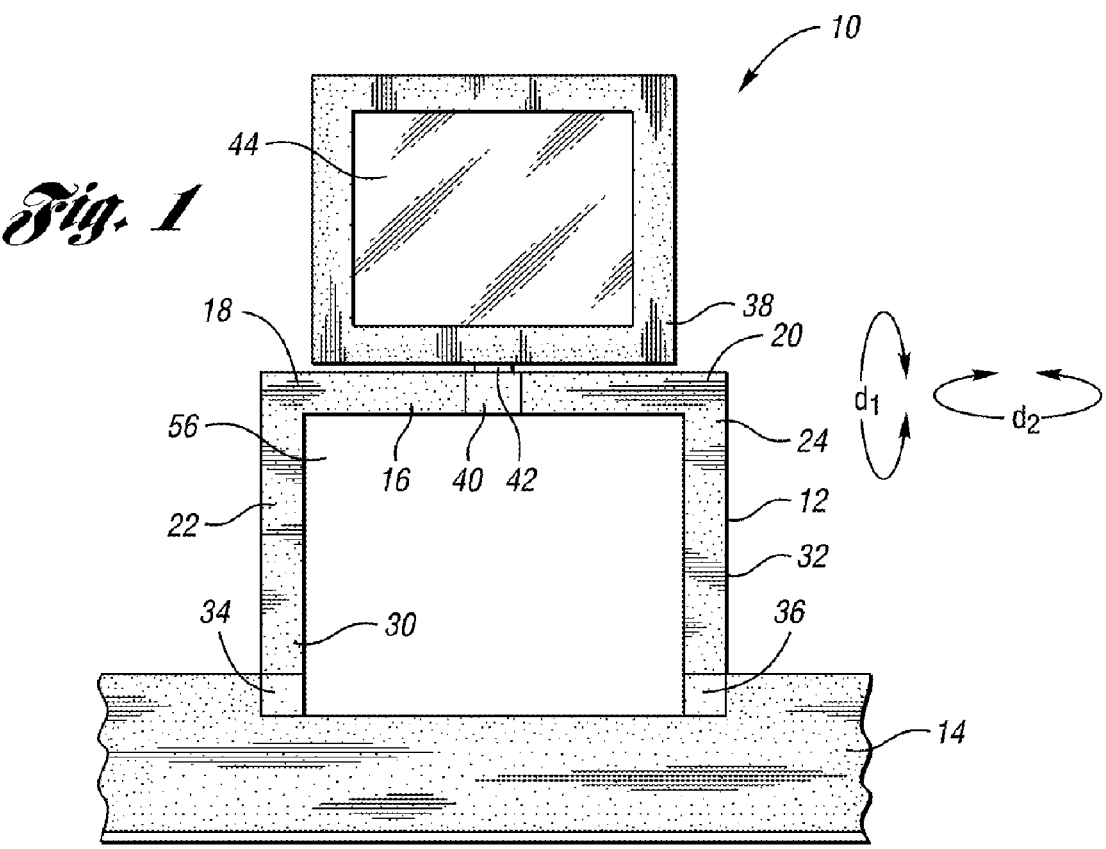
FIG. 1 is a front view of an embodiment of the entertainment system of the invention with a display mounted on a pivotable frame.
Figure 2:
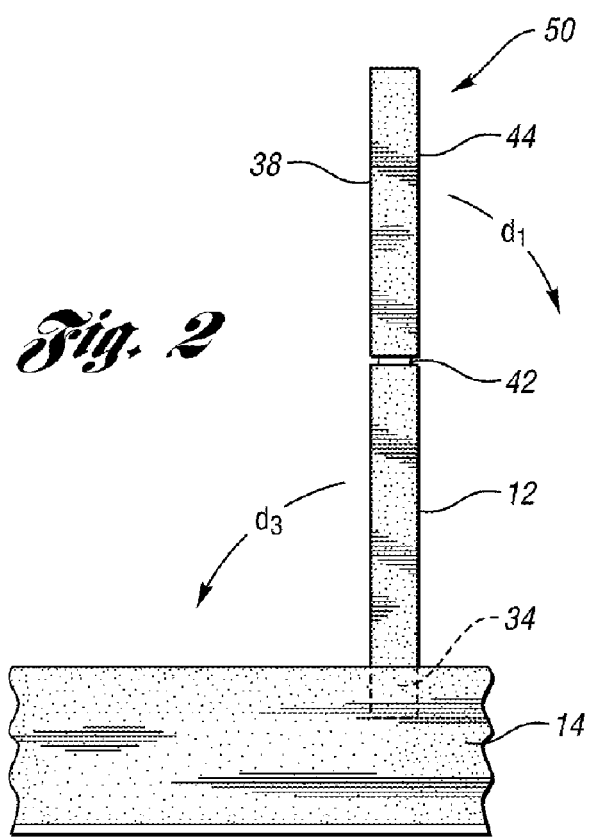
FIG. 2 is a side view of an embodiment of the entertainment system of the invention with a display mounted on a pivotable frame.

In an embodiment of the invention, an entertainment system that is mountable in a passenger compartment of an automobile is provided. With reference to FIGS. 1 and 2 a schematic of the entertainment system of the invention is provided. FIG. 1 provides a front view of an entertainment system of the invention with a display mounted on a pivotable frame. FIG. 2 provides a side view of an entertainment system of the invention with a display mounted on a pivotable frame. Entertainment system 10 includes frame 12 that is attachable to passenger compartment component 14. In a particularly useful variation of the invention, passenger compartment component 14 is a center console. In another variation of the invention, passenger compartment component 14 is an armrest. Frame 12 includes cross-member 16 having ends 18, 20. Frame 12 also includes stiles 22, 24. The term "stile" as used herein means the vertical members or arms in a frame. In some variations of the invention, entertainment system 10 includes one or more additional cross-members (not shown) connecting stiles 22, 24 to improve the rigidity of frame 12. Stile 22 is attached at end 18 of cross-member 16 at end 26, and stile 24 is attached at end 20 of cross-member 16 at end 28. End 30 of stile 22 and end 32 of stile 24 are each pivotable attached to passenger compartment component 14. Such pivotable attachments are made by pivotable joints 34, 36. Entertainment system 10 also includes display 38 which is attached to frame 12 such that the display is moveable in two independent directions $d_1$, $d_2$ about frame 12. Direction $d_1$ allows left-right movement of display 38 for a passenger viewing display 38. Direction $d_2$ allows motion perpendicular to $d_1$. Although in most variations of the invention directions $d_1$, $d_2$ are substantially perpendicular, perpendicularity is not necessary so long as directions $d_1$, $d_2$ are not the same. Such motion is achieved by pivotable joints 40, 42. In a variation of the invention, the functionality of pivotable joints 40, 42 may be incorporated into a single compound joint that allows movement in two distinct directions about frame 12.

As set forth above, entertainment system 10 includes display 38. Display 38 includes viewing side 44 which is the side viewed by the passengers. Examples of devices that are used for display 38 include, but are not limited to, flat panel displays such as liquid crystal ("LCD") displays, plasma displays, and the like. Moreover, display 38 may be used as the display device in entertainment systems that include, for example, televisions, video game systems, computer systems, DVD players, VCR players, and the like.

Figure 3A:
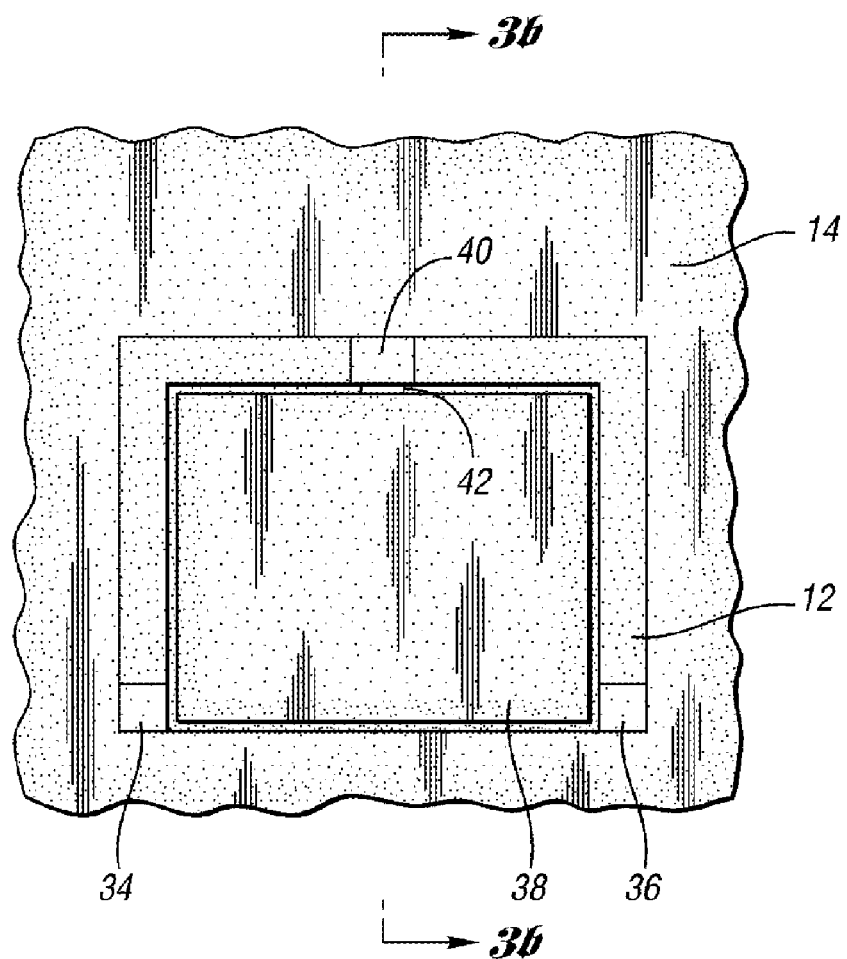
FIG. 3A is a top view of an embodiment of the entertainment system of the invention in the stowed position.
Figure 3B:
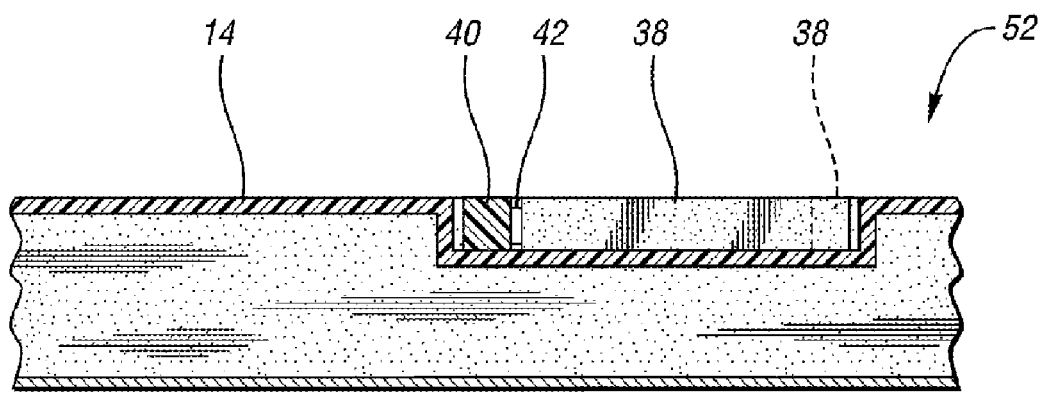
FIG. 3B is a cross-sectional view of an embodiment of the entertainment system of the invention in the stowed position.

With reference to FIGS. 1, 2, 3A and 3B, the present invention advantageously allows positioning of the display in first position 50 that is viewable by a passenger in the automobile and a second position 52 for stowing the display. FIG. 3A is a top view of an entertainment system of the invention in the stowed position. FIG. 3B is a cross-sectional view of an entertainment system of the invention in the stowed position. Specifically, entertainment system 10 is collapsible from position 50 to position 52. When positioned as position 50, viewing of the monitor may be adjusted by rotations along directions $d_1$ and $d_2$. Entertainment system 10 is stowed by pivoting along directions $d_1$ and $d_3$ until entertainment system 10 resides within a recessed cavity in passenger compartment component 14. It should be appreciated that directions $d_1$ and $d_3$ are opposite, that is, each is a partial rotation in the opposite sense (clockwise vs. counter clockwise). Moreover, when entertainment system 10 is in the stowed position, display 38 is positioned within receiving opening 56 which is defined by cross-member 16 and stiles 22, 24. When in the stowed position, viewing side 44 of display 38 faces and is proximate to passenger compartment component 14 thereby providing a measure of protection for viewing side 44. In a variation of the invention, entertainment system 10 will completely reside within cavity 54 such that entertainment system 10 is not viewable from a side perspective of passenger compartment component 14. In order to provide further integration of entertainment system 10 in a vehicle's passenger compartment, passenger compartment component 14 optionally includes a cover (not shown) that is used to conceal and protect entertainment system 10 when at second position 52. It should also be appreciated that display 38 is optionally also positionable in intermediate positions between first position 50 and second position 52 depending on the viewing preferences of a vehicle occupant.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An entertainment system that is mountable on a passenger compartment component of an automobile, the entertainment system comprising:
   a frame adapted to be pivotably mounted to the passenger compartment component, the frame comprising:
   a cross-member;
   a first stile having a first end and a second end, the first stile attached to the cross-member on the first end of the first stile and to the passenger compartment component on the second end of the first stile, wherein attachment to the second end is pivotable; and
   a second stile having a first end and a second end, the second stile attached to the cross-member on the first end of the second stile and to the passenger compartment component on the second end of the second stile, wherein attachment to the second end is pivotable; and
   a display having a viewing side, the display being attached to the frame such that the display is moveable in two directions about the frame,
   wherein the entertainment system is collapsible by the frame pivoting in a first direction and the display pivoting in a second direction that is opposite to the first direction such that the display is positionable within a receiving opening in the frame with the viewing side of the display facing the passenger compartment component.

2. The entertainment system of claim 1 wherein the display is a liquid crystal display.

3. The entertainment system of claim 1 wherein the display is a television.

4. The entertainment system of claim 1 wherein the display is a monitor.

5. The entertainment system of claim 1 wherein the passenger compartment component is an armrest.

6. The entertainment system of claim 1 wherein the passenger compartment component is a center console.

7. The entertainment system of claim 1 wherein the frame is attached to the passenger compartment component by one or more pivotable joints.

8. The entertainment system of claim 1 wherein the display is attached to the frame with a joint that is rotatable in two independent directions.

9. The entertainment system of claim 1 wherein the cross-member, the first stile, and the second stile define the receiving opening.

10. The entertainment system of claim 1 wherein the frame includes one or more additional cross-members.

11. An entertainment system that is mountable in a passenger compartment of an automobile, the entertainment system comprising:
    a frame adapted to be pivotably mounted to the passenger compartment component, the frame comprising:
    a cross-member;
    a first stile having a first end and a second end, the first stile attached to the cross-member on the first end of the first stile and to the passenger compartment component on the second end of the first stile, wherein attachment to the second end is pivotable; and
    a second stile having a first end and a second end, the second stile attached to the cross-member on the first end of the second stile and to the passenger compartment component on the second end of the second stile, wherein attachment to the second end is pivotable; and
    a display having a viewing side, the display being pivotally attached to the frame such that the display is positionable at a first position and a second position, the first position placing the viewing side in a position viewable by a passenger in the automobile and the second position placing the viewing side at a position proximate to the passenger compartment side and within a receiving opening at least partially defined by the frame.

12. The entertainment system of claim 11 wherein the display is a device selected from the group consisting of a monitor, a television, and a liquid crystal display.

13. The entertainment system of claim 11 wherein the passenger compartment component is a center console.

14. The entertainment system of claim 11 wherein the passenger compartment component is an armrest.

15. The entertainment system of claim 11 wherein the frame is attached to the passenger compartment component by one or more pivotable joints.

16. The entertainment system of claim 11 wherein the display is attached to the frame with a joint that is rotatable in two independent directions.

17. An entertainment system that is mountable in a passenger compartment of an automobile, the entertainment system comprising:
   a frame pivotably mounted to a center console, the frame including:
   a cross-member;
   a first stile having a first end and a second end, the first stile being attached to the cross-member on the first end of the first stile and to the passenger compartment component on the second end of the first stile, wherein attachment to the second end is pivotable; and
   a second stile having a first end and a second end, the second stile attached to the cross-member on the first end of the second stile and to the passenger compartment component on the second end of the second stile, wherein attachment to the second end is pivotable; and
   a display having a viewing side, the display device being pivotally attached to the frame such that the display is positionable at a first position and a second position, the first position placing the viewing side in a position viewable by a passenger in the automobile and the second position placing the viewing side at a position proximate to the center console and within a receiving opening at least partially defined by the frame.

18. The entertainment system of claim 17 wherein the passenger compartment component is a center console.

* * * * *